United States Patent
Birkhoelzer

(10) Patent No.: US 7,752,157 B2
(45) Date of Patent: Jul. 6, 2010

(54) HEALTHCARE WORKFLOW MANAGEMENT SYSTEM AND METHOD WITH CONTINUOUS STATUS MANAGEMENT AND STATE-BASED INSTRUCTION GENERATION

(75) Inventor: Thomas Birkhoelzer, Radolfzell (DE)

(73) Assignee: Siemens Aktiengesellschaft, Munich (DE)

( * ) Notice: Subject to any disclaimer, the term of this patent is extended or adjusted under 35 U.S.C. 154(b) by 520 days.

(21) Appl. No.: 10/673,213

(22) Filed: Sep. 30, 2003

(65) Prior Publication Data

US 2005/0065829 A1  Mar. 24, 2005

(30) Foreign Application Priority Data

Sep. 30, 2002  (DE)  ............... 102 45 931

(51) Int. Cl.
  *G06F 15/18*  (2006.01)
(52) U.S. Cl. ............... 706/52; 706/8; 706/45
(58) Field of Classification Search ........... 706/52, 706/8, 45
  See application file for complete search history.

(56) References Cited

U.S. PATENT DOCUMENTS

| | | | | |
|---|---|---|---|---|
| 5,799,101 A | * | 8/1998 | Lee et al. ............... | 382/133 |
| 5,839,438 A | * | 11/1998 | Graettinger et al. ........ | 600/300 |
| 5,970,482 A | * | 10/1999 | Pham et al. ............... | 706/16 |
| 6,029,144 A | * | 2/2000 | Barrett et al. ............ | 705/30 |
| 6,282,531 B1 | * | 8/2001 | Haughton et al. .......... | 706/50 |
| 6,405,215 B1 | * | 6/2002 | Yaung ................... | 707/104.1 |
| 6,876,894 B1 | * | 4/2005 | Chen et al. ............... | 700/100 |
| 6,988,088 B1 | * | 1/2006 | Miikkulainen et al. ...... | 706/14 |
| 2002/0138301 A1 | * | 9/2002 | Karras et al. ............. | 705/2 |

OTHER PUBLICATIONS

CSCW- 98 Workshop, "Towards Adaptive Workflow Systems," Toolkit for Enabling Analyses and Modeling of Adaptive Workflow (TEAMWORK), 1998.
F. Dahlstrand et al., "Alarm Analysis with Fuzzy Logic and Multi-level Flow Models," 1998.

* cited by examiner

*Primary Examiner*—Donald Sparks
*Assistant Examiner*—Adrian L Kennedy
(74) *Attorney, Agent, or Firm*—Harness, Dickey & Pierce, P.L.C.

(57) ABSTRACT

A workflow management system with continuous status management includes an apparatus for detecting fuzzy process definitions, an apparatus which controls activity stages in a workflow for the purpose of processing the process definitions, and a device for evaluating the process definitions for each process instance. A method is for implementing a workflow with continuous status management through fuzzy process definitions using continuous instructions and states and logic combinations or continuous mapping operations operating thereon.

31 Claims, 3 Drawing Sheets

HEALTHCARE WORKFLOW MANAGEMENT SYSTEM AND METHOD WITH CONTINUOUS STATUS MANAGEMENT AND STATE-BASED INSTRUCTION GENERATION

The present application hereby claims priority under 35 U.S.C. §119 on German patent application number DE 102 45 931.2 filed Sep. 30, 2002, the entire contents of which are hereby incorporated herein by reference.

FIELD OF THE INVENTION

The invention generally relates to a workflow management system and method for status management.

BACKGROUND OF THE INVENTION

A patient in a hospital or in a department, for example in radiology, is treated in accordance with explicit or implicit rules which determine the "workflow". To be able to support these workflows effectively using IT technologies, "workflow management systems" are being used to an increasing extent.

This requires the rules of the workflow to be modeled explicitly in a computer-interpretable form, for example by process models or by event-triggered rules.

Workflows controlled by humans normally do not have any prior modeling according to fixed criteria, however, but rather adapt flexibly to the situation to a certain extent. Thus, in a stressful or emergency situation, less time will remain for procuring old information or for compiling exemplary cases for teaching than in a normal routine mode. The network utilization level or the memory's filling level may also limit the volume of preloaded images.

The processing of a given task likewise follows more of a continuous sequence than a "strict progression", and hence, depending on utilization level, work may actually be started even when all prerequisites have not yet been satisfied.

In workflow management systems known today, only discrete instructions and states and, derived from these, only discrete logic relations or rules are processed.

FIGS. 1 and 2 are used to describe an example of such a classical workflow management system. FIG. 1 shows a discrete process description for a process including a plurality of activities. Once the first activity 1, shown symbolically, is complete, the second activity 2 is started. Only when this second activity 2 is complete is the activity 3 started. This can also be shown more precisely with reference to the discrete flow shown in FIG. 2. A "workflow engine" 4 starts the first activity 1 in a first step a. Once the first activity 1 with its task has finished, it reports this to the workflow engine 4 in a step b. The workflow engine 4 then initiates the second activity 2 in a step c. Once the second activity 2 is complete, it reports this to the workflow engine 4 in turn in a step d, whereupon the third activity 3 is started on the basis of a step e.

Such a restriction to discrete variables therefore results in the following problems:
1. If the degree of discretization is too coarse, hard switching occurs between "fully or not at all" situations.
2. If, on the other hand, the degree of discretization if fine, then an extremely large number of cases need to be modeled explicitly by rules.

SUMMARY OF THE INVENTION

An embodiment of the invention is based on an object of developing a workflow management system of the type mentioned initially such that the tasks of a workflow are easy to model and quick to carry out.

An embodiment of the invention achieves an object for an apparatus by virtue of the workflow management system with continuous status management being provided with an apparatus for detecting fuzzy process definitions, with an apparatus which controls activity stages in a workflow for the purpose of processing the process definitions, and means for evaluating the process definitions for each process instance.

In line with an embodiment of the invention, the apparatus can have an interference machine which is provided with an interference mechanism which is in contact with a process instance manager which forwards a signal corresponding to the respective instruction for the activities of the activity stages to the latter.

Advantageously, the activity stages can have an associated control stage which is supplied with an activity threshold by an evaluation stage for the process status and which is connected to a functional stage for carrying out the activities, and the functional stage forwards a signal corresponding to the respective state of the activities of the activity stages to the process instance manager.

It has been found to be advantageous if the apparatus delivers instructions to activities of the activity stages with an associated continuous variable which are compared with an activity threshold for the control stage and which provide corresponding "fuzzy" worklists for each activity of the activity stages, which reports its state to the apparatus in the form of continuous variables.

In line with an embodiment of the invention, the apparatus can have causal networks and/or can operate on the basis of the laws of fuzzy logic, of probability-based modeling or of general weighting.

An embodiment of the invention achieves an object for a method by virtue of implementing a workflow with continuous status management through fuzzy process definitions using continuous instructions and states and logic combinations or continuous mapping operations operating thereon.

Advantageously, the continuous mapping operations can be performed using fuzzy rules and/or relations, on the basis of the rules of fuzzy logic, on the basis of the rules of probability-based modeling or on the basis of the rules of control systems with priority weighting.

BRIEF DESCRIPTION OF THE DRAWINGS

The present invention will become more fully understood from the detailed description of preferred embodiments given hereinbelow and the accompanying drawings, which are given by way of illustration only and thus are not limitative of the present invention, and wherein.

DETAILED DESCRIPTION OF THE PREFERRED EMBODIMENTS

Figure 1:
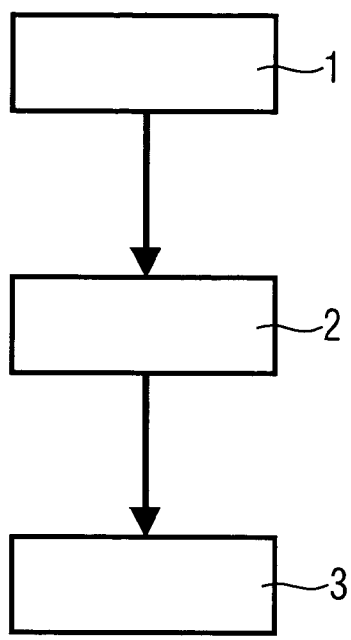
FIG. 1 shows a discrete process description of a classical workflow management system.
Figure 2:
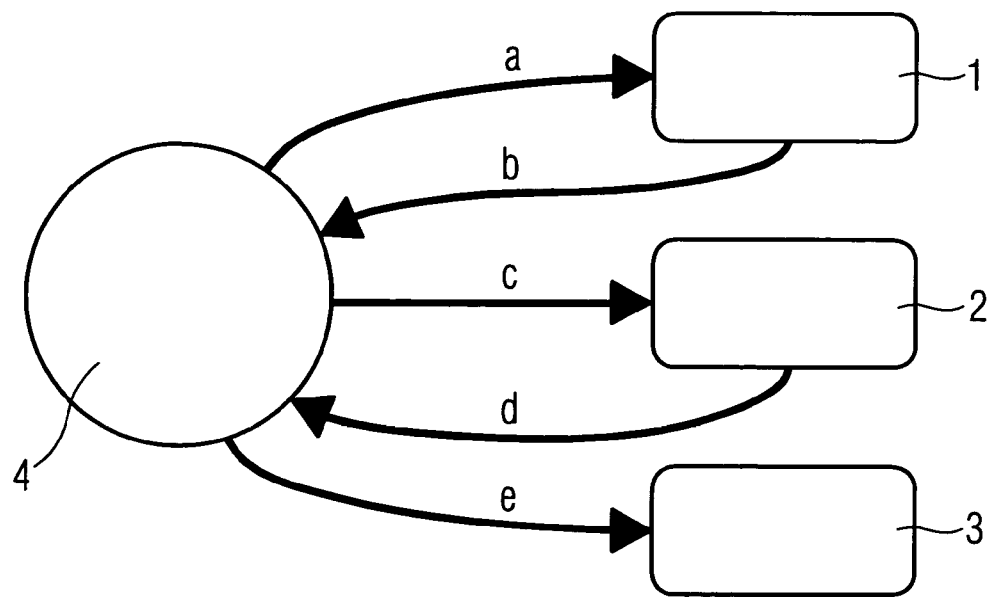
FIG. 2 shows a discrete flow description of a classical workflow management system.
Figure 3:
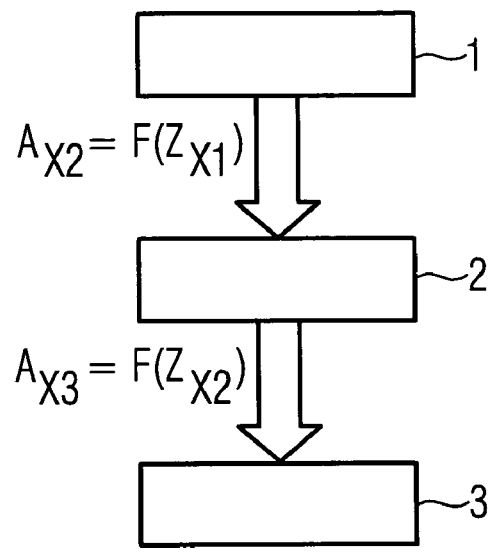
FIG. 3 shows a process description of an inventive workflow management system with continuous states.
Figure 4:
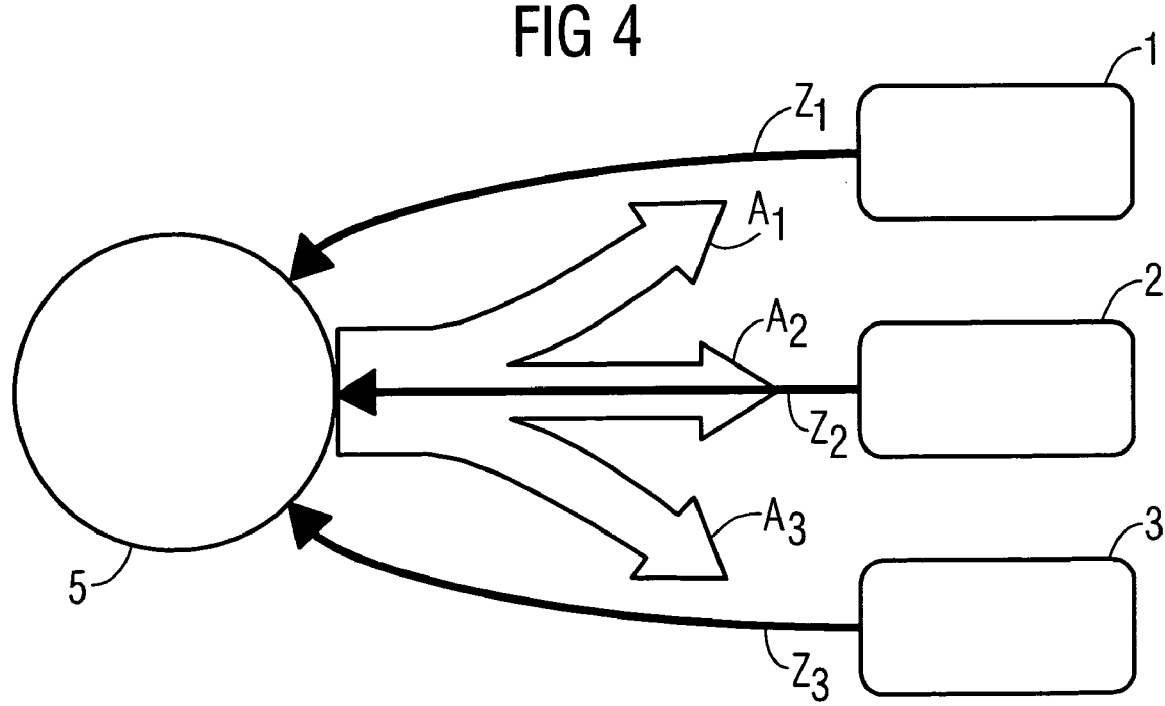
FIG. 4 shows a continuous flow description of an inventive workflow management system.

FIGS. 3 and 4 are now used to describe an example of an inventive workflow management system with continuous states for a process including a plurality of activities. FIG. 3 shows the process description with continuous variables. In this context, however, the subsequent activities 2 and 3 are initiated on the basis of the state $Z_x$ of the activity 1 or 2. This can be described by the activation function $A_{xn} = F(Z_{xn})$, the "instruction volume". This activation function F(x) can be 1 if x>1, can be 2(x−0.5) if 0.5<x<1, and can assume 0 if x<0.5.

F: Activation function, for example:

$$F(x) = 1 \quad \text{if} \quad x > 1$$
$$2(x - 0.5) \quad \text{if} \quad 0.5 < x < 1$$
$$0 \quad \text{if} \quad x < 0.5$$

FIG. 4 shows this operation with reference to a continuous parallel instruction simultaneously to all activities. The interference machine 5, a system for processing process definitions which controls the workflow, sends the continuous instructions $A_{X1}$, $A_{X2}$ and $A_{X3}$ in parallel to the activities 1 to 3. These report the respective states of the activities $Z_{X1}$, $Z_{X2}$ and $Z_{X3}$ to the interference machine 5. On the basis of these states $Z_{X1}$, $Z_{X2}$ and $Z_{X3}$ subsequent activities are ascertained and initiated.

Figure 5:
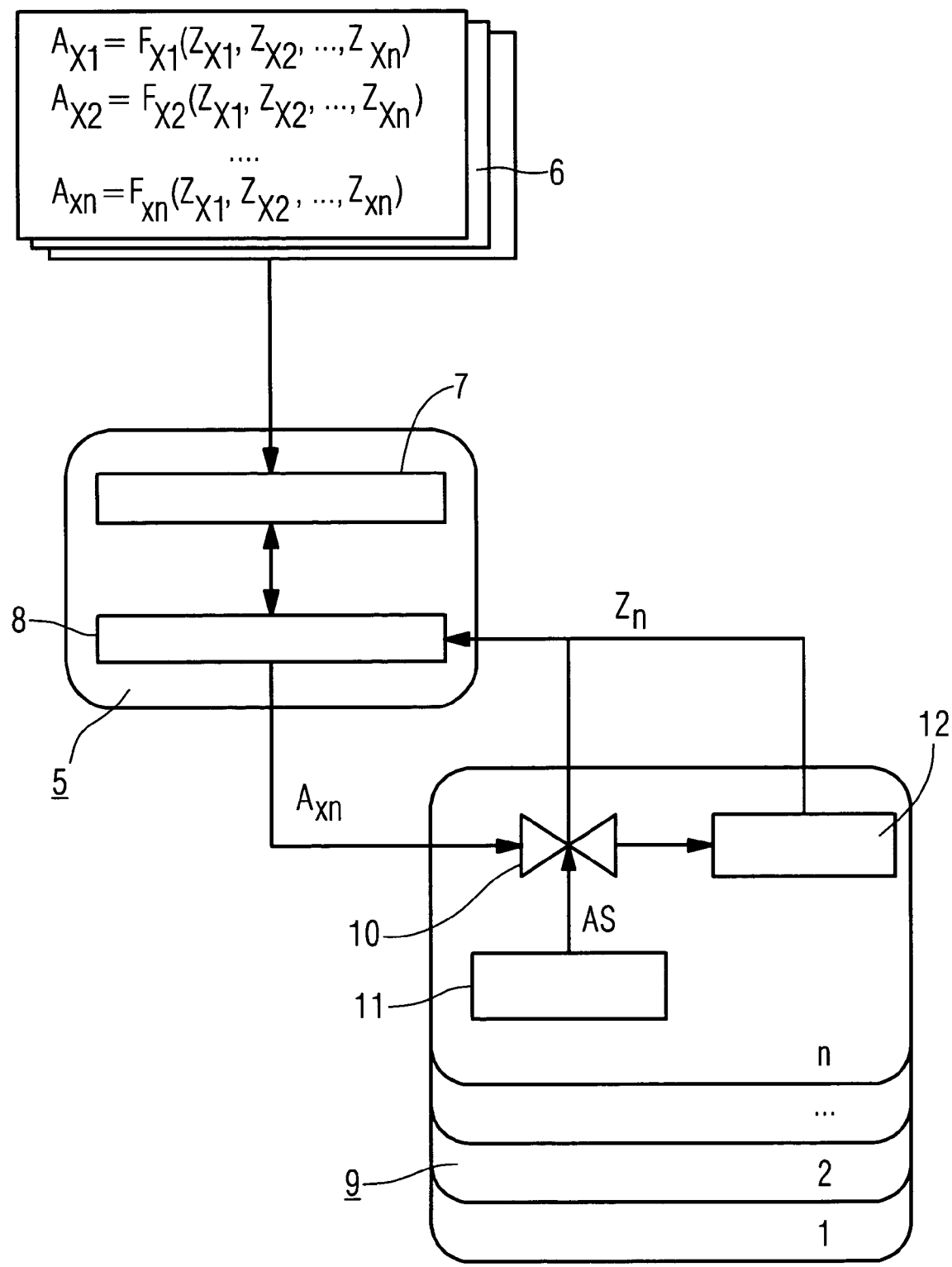
FIG. 5 shows an inventive workflow management system.

FIG. 5 is now used to give a more detailed description of the procedure in the workflow management system. First, an apparatus 6 is used to determine and to stipulate the process definitions, with $A_n$ representing the continuous instruction to the activity n and $Z_n$ representing the continuous state of the activity n. The apparatus 6 can have an input apparatus and memory apparatuses. It then contains the instructions for the individual activities in a form of function equations, and given by the following examples for the instruction volumes $A_{xn}$ of the individual activities 1 to n:

$$A_{X1} = F_{X1}(Z_{X1}, Z_{X2}, \ldots, Z_{Xn})$$

$$A_{X2} = F_{X2}(Z_{X1}, Z_{X2}, \ldots, X_{Xn})$$

. . . . . .

$$A_{Xn} = F_{Xn}(Z_{X1}, Z_{X2}, \ldots, Z_{Xn})$$

These equations for the activation function, which are stipulated once but can be altered at any time, are supplied to the interference mechanism 7 of the interference machine 5 as process definitions. This interference mechanism 7 is in contact with a process instance manager 8 which delivers the instruction volume $A_{xn}$ to the activity n of the activity stages 9. This instruction volume $A_{xn}$ is supplied to a control stage 10 which is supplied with an activation threshold AS by an evaluation stage 11 for the process status. The control stage 10 is connected to the functional stage 12 off the activity n of the activity stages 9, which carries out the instructions of the activity n. The functional stage 12, in turn reports the state $Z_{xn}$ of the activity n to the process instance manager 8, which then reascertains the instruction volume $A_{xn}$, so that this instruction volume is continuously matched to the respective circumstances and to the respective status or process progress.

The inventive workflow, i.e. the definition of a process using continuous instructions and states and continuous mapping operations operating thereon, for example through fuzzy rules and/or relations, can use the following concepts known from IT technology:

fuzzy logic, probability-based modeling, for example with causal networks, i.e. if situation A has arisen then step B follows with a probability of y, rule systems with priority weighting, i.e. if situation A has arisen then step B follows with a priority of z.

The interference machine 5 designed in accordance with an embodiment of the invention is able to evaluate the fuzzy process definitions described above for each process instance.

Such an interference machine 5 is a generalization of a workflow engine to continuous states and logic combinations on the basis of the concept behind the modeling, such as fuzzy, probability-based or general weighting. The interference mechanisms required for this have been integrated into the concept of a workflow engine.

The interference machine 5 delivers instructions to activities with an associated, continuous variable, the "instruction volume", for example probability, priority or weighting. These instructions produce corresponding "fuzzy" worklists for each activity. The activity reports its state in the form of continuous variables.

The use of continuous instructions and states and logic combinations operating thereon serves for the inventive control of a medical workflow. In this context, the following points need to be taken into account:

The continuous instructions $A_n$ are interpreted as priority. Accordingly, the tasks $A_n$ in an activity can be processed according to their priority. The priority can change continuously. Thus, by way of example, the priority of a task can increase in proportion to the prior weighting time. This prevents tasks with low priority from being continually suppressed by tasks with higher priority.

The continuous states are interpreted as degree of processing. Accordingly, the activity n continually delivers a report ($Z_{Xn}$) about the degree of processing already achieved to the central interference machine 5 as workflow engine. In this way, it is possible to start subsequent tasks even before the previous task has been formally completed.

Each activity n has an associated continuous variable, the "activation threshold". This "activation threshold" is dynamically dependent on the situation of the process, not the process instance. Thus, the "activation threshold" is determined, by way of example, by the current utilization level of the activity (e.g. the filling level of a memory) or the current utilization level of other activities (network). The activation thresholds can also be calculated centrally for a plurality of or all activities.

No activation threshold (=activity can always be performed) is contained as a special case in this context.

An activity n is activated by the workflow management system if and only if the instruction volume is above the activation threshold.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A workflow management system with continuous status management in a hospital or a hospital department, comprising:

a first apparatus adapted to detect fuzzy process definitions of a clinical workflow;

a second apparatus adapted to iteratively generate instruction volumes for controlling activity stages according to said fuzzy process definitions in said clinical workflow for the purpose of processing the process definitions; and means for evaluating the process definitions for each clinical process instance, the means for evaluating including a functional stage for initiating the activity associated with the activity stages and reporting the state of the activity to the second apparatus; wherein the second apparatus iteratively generates the instruction volumes based on the reported state of the activity so that the instruction volumes are continuously matched to circumstances and respective statuses or process progress of the activity.

2. The workflow management system as claimed in claim 1, wherein at least one of the apparatuses includes an interference machine.

3. The workflow management system as claimed in claim 1, wherein at least one of the apparatuses includes an interference mechanism, arranged in an interference machine and in contact with a process instance manager, adapted to forward a signal corresponding to the respective instruction for activities of the activity stages to the process instance manager.

4. The workflow management system as claimed in claim 3, wherein the means for evaluating includes a control stage, supplied with an activity threshold by an evaluation stage for the process status and connected to the functional stage for carrying out the activities, and wherein the functional stage is adapted to forward a signal corresponding to the respective state of the activities of the activity stages to the process instance manager.

5. The workflow management system as claimed in claim 1, wherein at least one of the apparatuses is adapted to deliver instructions to activities of the activity stages with an associated continuous variable, the instructions being compared with an activity threshold for the control stage and providing corresponding "fuzzy" worklists for each activity of the activity stages, which reports its state to the at least one apparatus in the form of continuous variables.

6. The workflow management system as claimed in claim 1, wherein at least one of the apparatuses includes causal networks.

7. The workflow management system as claimed in claim 1, wherein at least one of the apparatuses is adapted to operate on the basis of the laws of fuzzy logic.

8. The workflow management system as claimed in claim 1, wherein at least one of the apparatuses is adapted to operate on the basis of the laws of probability-based modeling.

9. The workflow management system as claimed in claim 1, wherein at least one of the apparatuses is adapted to operate on the basis of the laws of general weighting.

10. A method for implementing a workflow with continuous status management in a hospital or a hospital department through fuzzy process definitions, comprising:
  detecting, by a clinical workflow management system in the hospital or hospital department, fuzzy process definitions of a clinical workflow for patient treatment;
  iteratively generating, by the clinical workflow management system in the hospital or hospital department, instruction volumes for controlling activity stages according to said fuzzy process definitions in said clinical workflow for the purpose of processing the process definitions; and
  evaluating, by the clinical workflow management system in the hospital or hospital department, the process definitions for each clinical process instance, the evaluating including at least initiating an activity associated with an activity stage and reporting the state of the activity to be used in controlling the activity stages; wherein
  the instruction volumes are iteratively generated based on the reported state of the activity so that the instruction volumes are continuously matched to circumstances and respective statuses or process progress of the activity.

11. The method as claimed in claim 10, wherein the continuous mapping operations are performed using at least one of fuzzy rules and relations.

12. The method as claimed in claim 10, wherein the continuous mapping operations are performed on the basis of the rules of fuzzy logic.

13. The method as claimed in claim 10, wherein the continuous mapping operations are performed on the basis of the rules of probability-based modeling.

14. The method as claimed in claim 10, wherein the continuous mapping operations are performed on the basis of the rules of control systems with priority weighting.

15. The workflow management system as claimed in claim 2, wherein at least one of the apparatuses includes an interference mechanism, arranged in an interference machine and in contact with a process instance manager, adapted to forward a signal corresponding to the respective instruction for activities of the activity stages to the process instance manager.

16. The workflow management system as claimed in claim 2, wherein at least one of the apparatuses is adapted to deliver instructions to activities of the activity stages with an associated continuous variable, the instructions being compared with an activity threshold for the control stage and providing corresponding "fuzzy" worklists for each activity of the activity stages, which reports its state to the at least one apparatus in the form of continuous variables.

17. The workflow management system as claimed in claim 3, wherein at least one of the apparatuses is adapted to deliver instructions to activities of the activity stages with an associated continuous variable, the instructions being compared with an activity threshold for the control stage and providing corresponding "fuzzy" worklists for each activity of the activity stages, which reports its state to the at least one apparatus in the form of continuous variables.

18. The workflow management system as claimed in claim 4, wherein at least one of the apparatuses is adapted to deliver instructions to activities of the activity stages with an associated continuous variable, the instructions being compared with an activity threshold for the control stage and providing corresponding "fuzzy" worklists for each activity of the activity stages, which reports its state to the at least one apparatus in the form of continuous variables.

19. The method as claimed in claim 11, wherein the continuous mapping operations are performed on the basis of the rules of fuzzy logic.

20. The method as claimed in claim 11, wherein the continuous mapping operations are performed on the basis of the rules of probability-based modeling.

21. The method as claimed in claim 10, wherein the continuous mapping operations are performed on the basis of the rules of fuzzy logic.

22. The method as claimed in claim 10, wherein the continuous mapping operations are performed on the basis of the rules of fuzzy logic.

23. The method as claimed in claim 13, wherein the continuous mapping operations are performed on the basis of the rules of probability-based modeling.

24. A workflow management system with continuous status management in a hospital or a hospital department, comprising:
  means for detecting fuzzy process definitions of a clinical workflow;
  means for iteratively generating instruction volumes to control activity stages according to said fuzzy process definitions in said clinical workflow for the purpose of processing the process definitions; and means for evaluating the process definitions for each clinical process instance, the means for evaluating including a functional stage for initiating an activity associated with an activity stage and reporting the state of the activity to the means for iteratively generating instruction volumes; wherein the instruction volumes are iteratively generated based on the reported state of the activity so that the instruction volumes are continuously matched to circumstances and respective statuses or process progress of the activity.

25. The workflow management system of claim 1, wherein the first and second apparatuses are separate and discrete apparatuses.

26. A workflow management system with continuous status management in a hospital or a hospital department, comprising:

a first apparatus adapted to detect fuzzy process definitions of a clinical workflow;

a second apparatus adapted to iteratively generate instruction volumes to control activity stages according to said fuzzy process definitions in said clinical workflow for the purpose of processing the process definitions; and means for evaluating the process definitions for each clinical process instance, the means for evaluating including a functional stage for initiating an activity associated with an activity stage and reporting the state of the activity to the second apparatus; wherein the second apparatus iteratively generates instruction volumes based on the reported state of the activity so that the instruction volumes are continuously matched to circumstances and respective statuses or process progress of the activity, and the second apparatus is adapted to control activity stages in a workflow for the purpose of processing the process definitions independent of human intervention.

27. The workflow management system as claimed in claim 10, wherein the activity stages are controlled independent of human intervention.

28. The workflow management system as claimed in claim 24, wherein the activity stages are controlled independent of human intervention.

29. The workflow management system of claim 1, wherein instruction volumes are interpreted as priority such that activities are processed according to their priority.

30. The workflow management system of claim 1, wherein the states of the activities represent a degree of processing of the activity such that the activity continually delivers the state of the activity, wherein the state of the activity is a report about the degree of processing of the activity already achieved.

31. The workflow management system of claim 1, wherein each activity has an associated activation threshold, which is a continuous variable that is dynamically dependent on the situation of the process, the activation threshold being determined by the current utilization level of the activity or the current utilization level of other activities.

* * * * *